United States Patent
Okamoto et al.

(10) Patent No.: US 6,388,003 B1
(45) Date of Patent: *May 14, 2002

(54) POLYARYLENSULFIDE, POLYARYLENSULFIDE RESIN COMPOSITION, METHOD FOR PRODUCING POLYARYLENSULFIDE

(75) Inventors: Masaya Okamoto; Toru Bando, both of Ichihara (JP)

(73) Assignees: Idemitsu Kosan Co., Ltd.; Idemitsu Petrochemical Co., Ltd.; Petroleum Energy Center (PEC), all of Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,011

(22) Filed: Sep. 15, 1999

(30) Foreign Application Priority Data

Sep. 22, 1998 (JP) ............................................. 10-267901

(51) Int. Cl.⁷ ............................ C08L 81/04; C08K 3/04; C08K 3/22; C08K 3/40
(52) U.S. Cl. ........................ 524/609; 524/414; 524/420; 524/425; 524/444; 524/494; 524/495; 524/431; 525/537
(58) Field of Search ................................. 524/609, 494; 525/537

(56) References Cited

U.S. PATENT DOCUMENTS

| 3,919,177 | A | * | 11/1975 | Campbell |
| 4,038,261 | A | * | 7/1977 | Crouch et al. |
| 4,115,283 | A | * | 9/1978 | Needham |
| 4,365,037 | A | * | 12/1982 | Adachi et al. |
| 4,889,893 | A | * | 12/1989 | Kobayashi et al. ......... 525/537 |

* cited by examiner

*Primary Examiner*—Tae H. Yoon
(74) *Attorney, Agent, or Firm*—Oblon, Spivak, McClelland, Maier & Neustadt, P.C.

(57) ABSTRACT

Provided are a polyarylene sulfide having a chloroform soluble content of at most 0.5% by weight and having an inherent viscosity ηinh of from 0.05 to 0.4; a polyarylene sulfide resin composition comprising a polyarylene sulfide and an inorganic filler, of which the chloroform soluble content is at most 0.5% by weight relative to the polyarylene sulfide in the composition; car parts produced through injection molding of the composition; and a method for producing a polyarylene sulfide. The polyarylene sulfide has a reduced content of low-molecular components, and has well balanced properties of fluidity, flexural strength and impact resistance.

7 Claims, No Drawings

POLYARYLENSULFIDE, POLYARYLENSULFIDE RESIN COMPOSITION, METHOD FOR PRODUCING POLYARYLENSULFIDE

BACKGROUND OF THE INVENTION

1. Field of the Invention

The present invention relates to a novel polyarylene sulfide, a polyarylene sulfide resin composition comprising it, injection moldings of the composition, and a method for producing the polyarylene sulfide. Precisely, the invention relates to a resin composition comprising a polyarylene sulfide and glass fibers, of which the chloroform soluble content is at most 0.5% by weight and which therefore has much balanced properties of fluidity, flexural strength and impact resistance, and also to injection moldings of the composition for car parts. Further, the invention relates to a novel polyarylene sulfide in which the content of low-molecular-weight components is reduced, and to a method for producing it.

2. Description of the Related Art

Polyphenylene sulfide is a typical one of polyarylene sulfides, and is much used for parts for cars and electric and electronic appliances, as having the advantages of good heat resistance, flame retardancy, rigidity, solvent resistance and electric insulation.

However, for parts to be used in severe conditions, for example, for those for car engines, conventional resin compositions comprising a composite of polyphenylene sulfide with glass fibers are still defective in mechanical strength.

One known means for overcoming the problem is to increase the molecular weight of polyphenylene sulfide for enhancing the mechanical strength of the resin compositions. In this case, however, the fluidity of the resin compositions is lowered and therefore the moldability thereof is degraded. Given that situation, it is desired to develop some technique for enhancing the mechanical strength of the resin compositions without lowering the fluidity thereof.

SUMMARY OF THE INVENTION

The present invention has its object to provide a polyarylene sulfide resin composition having well balanced mechanical strength with its fluidity being not reduced, and its injection moldings, and also to provide a novel polyarylene sulfide in which the content of low-molecular-weight components is reduced, and a method for producing it.

We, the present inventors have assiduously studied the subject matter as above, and, as a result, have completed the invention which is as follows:

[1] A polyarylene sulfide resin composition comprising (A) from 30 to 80% by weight of a polyarylene sulfide and (B) from 20 to 70% by weight of an inorganic filler, of which the chloroform soluble content is at most 0.5% by weight relative to the polyarylene sulfide in the composition.

[2] Car parts as produced through injection molding of the polyarylene sulfide resin composition of [1].

[3] A polyarylene sulfide having a chloroform soluble content of at most 0.5% by weight and having an inherent viscosity, ηinh, of from 0.05 to 0.4.

[4] A method for producing a polyarylene sulfide by reacting a dihalogenoaromatic compound with lithium sulfide in an aprotic organic solvent, which is characterized by adding from 21 to 100 mol %, relative to the starting lithium sulfide, of lithium hydroxide to the reaction system.

[5] The method for producing a polyarylene sulfide of [4], which is characterized by two-stage polymerization comprising a prepolymerization step of putting a part of the necessary amount of the starting dihalogenoaromatic compound into the reaction system and a final polycondensation step of adding the remaining part of the starting dihalogenoaromatic compound to the reaction mixture that contains the prepolymer formed in the previous step, or by multi-stage polymerization of repeating the two steps.

[6] A method for producing a polyarylene sulfide by putting a sulfur compound and a dihalogenoaromatic compound into a mixture containing lithium hydroxide in an aprotic organic solvent, which comprises;

(a) a step of putting a liquid or gaseous sulfur compound into a mixture containing lithium hydroxide in an aprotic organic solvent to lead direct reaction between the sulfur compound and lithium hydroxide, (b) a step of controlling the sulfur content of the resulting reaction mixture, (c) a step of controlling the lithium hydroxide content of the reaction mixture to fall between 21 and 100 mol % of lithium sulfide therein, and (d) a step of putting a dihalogenoaromatic compound into the reaction mixture to lead polycondensation of the compound.

[7] The method for producing a polyarylene sulfide of [6], which is characterized by two-stage polymerization comprising (e1) a prepolymerization step of putting the starting dihalogenoaromatic compound into the reaction mixture and (e2) a final polycondensation step of further putting the starting dihalogenoaromatic compound into the reaction mixture that contains the prepolymer formed in the previous step, or by multi-stage polymerization of repeating the two steps.

DETAILED DESCRIPTION OF THE INVENTION

Embodiments of the invention are described below.

Polyarylene Sulfide Resin Composition

One aspect of the invention is to provide a polyarylene sulfide resin composition comprising (A) from 30 to 80% by weight, preferably from 50 to 70% by weight, more preferably from 55 to 65% by weight of a polyarylene sulfide and (B) from 20 to 70% by weight, preferably from 30 to 50% by weight, more preferably from 35 to 45% by weight of an inorganic filler, of which the chloroform soluble content is at most 0.5% by weight, preferably at most 0.4% by weight, more preferably at most 0.3% by weight relative to the polyarylene sulfide in the composition.

In the composition, if the amount of the inorganic filler is larger than 70% by weight, the fluidity of the composition is reduced; but if smaller than 20% by weight, the dimension stability of the composition is degraded. Preferably, the resin composition contains a coupling agent. Where the inorganic filler to be in the resin composition is previously subjected to coupling treatment, the amount of the coupling agent to be added to the resin composition may be suitably determined depending on the degree of the pre-coupling treatment of the inorganic filler. If the pre-coupling treatment of the inorganic filler is satisfactory, any additional coupling agent will be unnecessary for the resin composition. However, when the inorganic filler is a non-treated one, from 0.1 to 3.0 parts by weight, relative to 100 parts by weight of the polyarylene sulfide resin (A) in the composition, of a coupling agent may be added to the composition.

Too much coupling agent over 3.0 parts by weight, if added to the resin composition, will cancel the capabilities of the inorganic filler in the composition. On the other hand, however, if the amount of the coupling agent added is smaller than 0.1 parts by weight, the mechanical strength of the composition will be reduced. If the chloroform soluble content of the resin composition that contains an inorganic filler is larger than 0.5% by weight, the balance of fluidity and mechanical strength of the composition is poor.

The inorganic filler for use in the invention includes, for example, glass fibers, carbon fibers, aramide fibers, potassium titanate whiskers, silicon carbide whiskers, mica ceramic fibers, wollastonite, mica, talc, silica, alumina, kaolin, clay, silica-alumina, carbon black, calcium carbonate, titanium oxide, lithium carbonate, molybdenum disulfide, graphite, iron oxide, glass beads, calcium phosphate, calcium sulfate, magnesium carbonate, magnesium phosphate, silicon nitride, hydrotalcite, etc. One or more of these inorganic fillers may be used either singly or as combined. Of those, especially preferred are glass fibers.

Glass fibers for use in the invention are not specifically defined, and may be any of alkali glass, low-alkali glass or non-alkali glass fibers. The fiber length preferably falls between 0.1 and 8 mm, more preferably between 0.3 and 6 mm; and the fiber diameter preferably falls between 0.1 and 30 μm, more preferably between 0.5 and 25 μm. If the fiber length is smaller than 0.1 mm, the reinforcing effect of the glass fibers will be poor; but if larger than 8 mm, the fluidity of the resin composition containing such long glass fibers will be poor. If the fiber diameter is smaller than 0.1 μm, the fluidity of the resin composition containing such thin glass fibers will be poor; but if larger than 30 μm, the strength of the resin composition containing such thick glass fibers will below. The morphology of the glass fibers for use herein is not also specifically defined. Various types of glass fibers are employable herein, including, for example, rovings, milled fibers, chopped strands, etc. One or more different types of glass fibers are used herein either singly or as combined.

For improving their affinity for resin, the glass fibers for use herein may be subjected to surface treatment with any of silane-type coupling agents such as aminosilane-type, epoxysilane-type, vinylsilane-type or methacrylsilane-type coupling agents, or titanate-type coupling agents such as tetramethyl orthotitanate-type or tetraethyl orthotitanate-type coupling agents, or chromium complexes or boron compounds.

As so mentioned hereinabove, any of the coupling agents noted above may be separately added to the resin composition, in place of surface treatment of the glass fibers therewith.

If desired, any of weather-proofing agents, ultraviolet absorbents, antioxidants, lubricants, antistatic agents, flame retardants and other additives may be added to the resin composition of the invention to such an extent that they do not detract from the properties of the composition. To produce the resin composition of the invention, a polyarylene sulfide resin and an inorganic filler are blended in the defined ratio as above, and kneaded, for example, in a ribbon tumbler, a Henschel mixer, a Banbury mixer, a drum tumbler, a single-screw extruder or the like. The temperature at which they are kneaded generally falls between 280 and 320° C.

Use

The polyarylene sulfide resin of the invention has the advantage of good balance between fluidity and mechanical strength, and can be molded into thin-walled and complicated moldings. The moldings are favorable to car parts, especially those for engines, and also to radiator parts, caps, hose clips, wiring connectors and others that are required to have high strength at high temperatures.

Polyarylene Sulfide

The novel polyarylene sulfide of the invention has a chloroform soluble content of at most 0.5% by weight, preferably at most 0.4% by weight, more preferably at most 0.3% by weight, and has an inherent viscosity, ηinh, of from 0.05 to 0.4, preferably from 0.10 to 0.35.

Since the amount of low-molecular-weight components therein is small, the polyarylene sulfide has high flexural strength and high impact resistance, and its fluidity is not reduced. When the polyarylene sulfide is combined with glass fibers, the resulting resin composition exhibits well-balanced physical properties which conventional resin compositions could not.

If the chloroform soluble content of the polyarylene sulfide is larger than 0.5% by weight, the balance of fluidity and mechanical strength of the resin is poor.

If the inherent viscosity, ηinh, of the polyarylene sulfide is smaller than 0.05, the mechanical strength of the resin will be low; but if larger than 0.4, the moldability of the resin will be poor. The polyarylene sulfide of the invention is a polymer having repetitive units of a structural formula, [—Ar—S—] wherein Ar indicates an arylene group and S indicates sulfur, in an amount of at least 70 mol %. Typically, it has repetitive units of the following chemical formula (I), in an amount of at least 70 mol %.

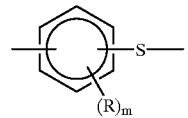

(I)

wherein R indicates a substituent selected from an alkyl or alkoxy group having at most 6 carbon atoms, a phenyl group, a carboxyl group or its metal salt, a nitro group, or a halogen atom including fluorine, chlorine and bromine atoms; and m indicates an integer of from 0 to 4.

If the ratio of the repetitive units in the resin is smaller than 70 mol %, the amount of the intrinsic crystalline component characteristic of crystalline polymer in the resin will be small. If so, the mechanical strength of the resin will be poor.

The polyarylene sulfide may be not only a homopolymer but also a copolymer.

The comonomer units for the copolymer polyarylene sulfide include, for example, metaphenylene sulfide units, orthophenylene sulfide units, p,p'-diphenyleneketone sulfide units, p,p'-diphenylenesulfone sulfide units, p,p'-biphenylene sulfide units, p,p'-diphenylenemethylene sulfide units, p,p'-diphenylenecumenyl sulfide units, naphthyl sulfide units, etc.

The polyarylene sulfide of the invention may be not only a polymer having a substantially linear structure but also a polymer having a branched structure or a crosslinked structure as formed through polymerization with a small amount of additional monomers having at least 3 functional groups. If desired, the branched or crosslinked polymer may be blended with the polymer having a substantially linear structure.

Method for Producing Polyarylene Sulfide

The invention also provides a novel method for producing polyarylene sulfides, and this is one preferred embodiment of producing the novel polyarylene sulfide of the invention noted above. The method is characterized by adding a sulfur source and an additional chemical (alkali metal hydroxide) in a defined ratio to the polymerization system. In the first aspect of the method, hydrogen sulfide gas or the like is used as the sulfur source and a lithium compound is used as the additional chemical serving for sulfur transfer and recovery.

We, the present applicant have clarified the basic principle of the method in our previous patent applications, Japanese Patent Laid-Open Nos. 343634/1993, 012215/1994, 044892/1994 and 076646/1994.

(I) First Aspect of Polymer Production Method

The first aspect is a method for producing a polyarylene sulfide by putting a sulfur compound and a dihalogenoaromatic compound into a mixture of lithium hydroxide and a solid substance except lithium hydroxide in an aprotic organic solvent, which comprises:

(a) a step of putting a liquid or gaseous sulfur compound into a mixture of lithium hydroxide and a solid substance except lithium hydroxide in an aprotic organic solvent to thereby lead direct reaction between lithium hydroxide and the sulfur compound, (b) a step of separating the solid substance except lithium hydroxide, (c) a step of controlling the sulfur content of the resulting reaction mixture, (d) a step of controlling the lithium hydroxide content of the reaction mixture to fall between 21 and 100 mol % of lithium sulfide therein, (e) a step of putting a dihalogenoaromatic compound into the reaction mixture to lead polycondensation of the compound, and (f) a step of putting an alkali metal hydroxide or an alkaline earth metal hydroxide into the reaction mixture which contains the side product lithium chloride and from which the polycondensation product polyarylene sulfide formed therein has been taken outside, thereby to lead reaction between lithium ions and hydroxyl ions, followed by collecting the reaction product lithium hydroxide to recover lithium ions from the mixture.

The steps are described in detail hereinunder.

(1) Addition of Sulfur Compound (Step (a))

In the method of the invention, a liquid or gaseous sulfur compound, for example, hydrogen sulfide gas is introduced into a mixture containing lithium hydroxide and a solid substance except lithium hydroxide (e.g., sodium chloride) in an aprotic organic solvent, such as N-methyl-2-pyrrolidone (hereinafter referred to as NMP) to lead direct reaction between lithium hydroxide and the sulfur compound. Through the reaction, lithium hydroxide is converted into lithium thiol (LiSH) soluble in NMP, whereby the NMP-insoluble, solid substance except lithium hydroxide (e.g., sodium chloride) is made separable from the reaction mixture. During the reaction, the temperature of the reaction system must be kept lower than 150° C. If the temperature is above 150° C., the NMP-soluble lithium thiol (LiSH) will be further converted into lithium sulfide ($Li_2S$) insoluble in NMP. If so, the NMP-insoluble, solid substance except lithium hydroxide (e.g., sodium chloride) could not be separated from the reaction mixture.

The amount of the sulfur compound to be added may fall, in terms of the mol of the sulfur atom constituting the compound, between 0.5 and 2 times the mol of lithium hydroxide added. If the amount is smaller than 0.5 times mols, a part of lithium hydroxide will remain in the reaction mixture. On the other hand, even if a large amount of the sulfur compound over 2 times mols is added, the reaction will be saturated before the addition of such an excessive amount of the sulfur compound. The sulfur compound is toxic, and excessively adding it is unfavorable.

As the sulfur compound to be used herein, preferred is hydrogen sulfide gas. Hydrogen sulfide gas may be introduced into the mixture either under normal pressure or under elevated pressure. The time for the gas introduction may fall generally between 10 and 180 minutes or so. The gas flow rate may fall generally between 10 and 1000 cc/min or so. For the gas introduction, for example, generally employed is a method of bubbling the gas into the mixture of lithium hydroxide and a solid substance except lithium hydroxide (e.g., sodium chloride) in NMP with the mixture being stirred.

The aprotic organic solvent to be used herein is generally selected from aprotic polar organic compounds (e.g., amide compounds, lactam compounds, urea compounds, organic sulfur compounds, organic cyclic phosphorus compounds, etc.). A single solvent or a mixed solvent of those compounds may be used herein.

Concretely, the amide compounds include N,N-dimethylformamide, N,N-diethylformamide, N,N-dimethylacetamide, etc.

The lactam compounds include caprolactam; N-alkylcaprolactams such as N-methylcaprolactam, N-ethylcaprolactam, etc.; and also N-methyl-2-pyrrolidone (NMP), N-ethyl-2-pyrrolidone, N-isopropyl-2-pyrrolidone, etc.

The urea compounds include tetramethylurea, N,N'-dimethylethyleneurea, etc.

The organic sulfur compounds include dimethyl sulfoxide, diethyl sulfoxide, diphenyl sulfone, 1-methyl-1-oxosulfolane, etc.

The organic cyclic phosphorus compounds include 1-methyl-1-oxophospholane, 1-n-propyl-1-oxophospholane, 1-phenyl-1-oxophospholane, etc.

Of the aprotic organic solvents mentioned above, preferred are N-alkylcaprolactams and N-alkylpyrrolidones; and more preferred is N-methyl-2-pyrrolidone.

The solid substance except lithium hydroxide for use herein is meant to indicate a solid substance excluding lithium hydroxide, and this includes, for example, alkali metal chlorides and alkaline earth metal chlorides such as sodium chloride, calcium chloride, magnesium chloride, barium chloride, etc.

The solid substance except lithium hydroxide, which is separable in this step, is any of those alkali metal chlorides and alkaline earth metal chlorides, such as sodium chloride, etc.

(2) Separation of Solid Substance Except lithium hydroxide (Step (b))

In the previous step, a sulfur compound is put into the mixture, whereby the NMP-insoluble lithium hydroxide existing in the mixture is converted into NMP-soluble lithium thiol (LiSH). As a result, the solid substance except lithium hydroxide (e.g., sodium chloride), which is insoluble in NMP and which exists in the mixture, becomes separable from the mixture.

To separate it, employable are any known means of filtration through a glass filter G4, centrifugation or the like. In the step for separating it, the temperature of the mixture may fall generally between 20 and 150° C.

(3) Control of Sulfur Content (Step (c))

In this step, the reaction mixture from which the solid substance except lithium hydroxide (e.g., sodium chloride) has been separated is subjected to dehydrosulfurization to remove the excess sulfur component from it, and, in addition, water having been produced as the side product in the previous step of introducing hydrogen sulfide into the mixture is also removed from it.

Precisely, in this step, the atomic ratio of sulfur/lithium in the mixture is preferably controlled to be at most 1/2, more preferably 1/2 in order to facilitate the next polymerization step with a dihalogenoaromatic compound. If the atomic ratio is larger than 1/2, the polymerization in the next step will be difficult. Regarding water that may exist in the polymerization step, a small amount of water will promote the oligomerization in some degree in the former stage, and will effectively function as a phase-separating agent in the latter final polymerization to increase the molecular weight of the oligomer formed in the former-stage oligomerization. However, both in the former and latter stages, too much water is unfavorable. This is because water (in NMP) will often expel the oligomer from NMP, thereby retarding the polymerization of the oligomer. For these reasons, therefore, it is desirable that the amount of water existing in the reaction mixture is controlled to fall between 10 and 200% of lithium hydroxide in the mixture.

For controlling the sulfur content and the water content of the reaction mixture, effectively employed is a method of bubbling nitrogen into the reaction mixture under heat to thereby remove sulfur and water from the mixture. In general, when the reaction mixture is heated at a temperature falling between 160 and 200° C., NMP-soluble lithium thiol (LiSH) is converted into NMP-insoluble lithium sulfide ($Li_2S$) while giving hydrogen sulfide.

(4) Control of Lithium Hydroxide Content (Step (d))

In this step, the amount of lithium hydroxide to be present in the reaction mixture is controlled to fall between 21 and 100 mol % of lithium sulfide ($Li_2S$) having been formed in the mixture.

Specifically, in the method of the invention, lithium hydroxide must be present in the reaction system comprising a starting dihalogenoaromatic compound and a direct sulfur source of lithium sulfide ($Li_2S$) that are necessary for the intended polycondensation, and its amount is controlled to fall between 21 and 100 mol %, preferably between 24 and 88 mol %, more preferably between 26 and 60 mol % of the sulfur source, lithium sulfide ($Li_2S$).

If the amount of lithium hydroxide existing in the reaction system is smaller than 21 mol %, it is difficult to control the chloroform soluble content of the final product, polyarylene sulfide to be at most 0.5% by weight. If so, the polymer could not have well-balanced fluidity and mechanical strength. On the other hand, even if the amount of lithium hydroxide existing in the reaction system is larger than 100 mol %, any further improvement in the property balance of the polymer could no more be expected.

This step is the most important part of the method of the invention. Though not clear, the reason will be because aromatic —SLi moieties capable of being easily polymerized into high-molecular-weight polymer segments will be much formed in the presence of excess lithium hydroxide while, on the other hand, forming aromatic —SH moieties that are hardly polymerized into high-molecular-weight polymer segments will be retarded in that condition. As a result, it is presumed that forming low-molecular-weight components will be retarded in the method of the invention.

(5) Polycondensation, Post-treatment (Step (e))

In this step, a dihalogenoaromatic compound is put into the previously prepared reaction mixture that contains lithium sulfide and lithium hydroxide, and polycondensed therein to give a polymer. The polymer is separated and washed to be the intended polyarylene sulfide.

The dihalogenoaromatic compound to be used herein includes, for example, p-dichlorobenzene, p-dibromobenzene, 2,5-dichlorotoluene, 2,5-dibromotoluene, 2,5-dichloro-tert-butylbenzene, 2,5-dibromo-tert-butylbenene, 2,5-dichlorobiphenyl, etc. Of the compounds, preferred are those containing at least 50 mol % of p-dichlorobenzene and/or p-dibromobenzene.

Not detracting from the effect of the invention, any other comonomers and branching agents may be copolymerized with the dihalogenoaromatic compound. The comonomers include, for example, 2,3-dichlorophenol, 2,3-dibromophenol, 2,4-dichlorophenol, 2,4-dibromophenol, 2,5-dichlorophenol, 2,5-dibromophenol, 2,4-dichloroaniline, 2,4-dibromoaniline, 2,5-dichloroaniline, 2,5-dibromoaniline, 3,3'-dichloro-4,4'-diaminobiphenyl, 3,3'-dibromo-4,4'-diaminobiphenyl, 3,3'-dichloro-4,4'-dihydroxybiphenyl, 3,3'-dibromo-4,4'-dihydroxybiphenyl, di(3-chloro-4-amino)phenylmethane, m-dichlorobenzene, m-dibromobenzene, o-dichlorobenzene, o-dibromobenzene, 4,4'-dichlorodiphenyl ether, 4,4'-dichlorodiphenyl sulfone, etc. The branching agents include, for example, 1,2,4-trichlorobenzene, 1,3,5-trichlorobenzene, 1,2,3-trichlorobenzene, etc.

One or more of these comonomers and branching agents may be employed herein, either singly or as combined.

The reactor for the polycondensation in this step may be, for example, a stainless steel autoclave having a capacity of 1 liter. This may be equipped with a paddle stirrer capable of rotating at a speed of from 300 to 700 rpm. The polymerization temperature preferably falls between 220 and 260° C., and the polymerization time preferably falls between 1 and 6 hours. The amount of the dihalogenoaromatic compound to be put into the reaction mixture is preferably such that the ratio (by mol) of the dihalogenoaromatic compound to sulfur to be in the system falls between 0.9 and 1.2, more preferably between 0.95 and 1.05. If the molar ratio is smaller than 0.9, the molecular weight of the polymer to be produced could not increase; and if larger than 1.2, the molecular weight thereof could not also increase.

The polymerization may be effected in one stage, or in two or more stages for two-stage or multi-stage polymerization. In the two-stage polymerization, the monomers are prepolymerized in the former stage, and the resulting prepolymer may be further polymerized into a final polymer having an increased molecular weight. Preferred is the two-stage polymerization favorable to production of polymers of different polymerization grades. Regarding the polymerization temperature and time in the two-stage polymerization, the former-stage prepolymerization may be effected at relatively low temperatures falling between 190 and 240° C. or so and will take 2 to 10 hours or so, and the latter-stage final polymerization may be effected at relatively high temperatures falling between 240 and 270° C. or so and will take 1 to 3 hours or so. As the case may be, the water content in the reaction system will be controlled separately in the former and latter stages.

The polymer formed may be subjected to any ordinary post-treatment. For example, the reaction system containing the polymer formed is cooled, and the precipitate formed therein is taken out through centrifugation, filtration or the like, and the thus-separated polymer is washed a few times with an organic solvent or water under heat or at room temperature to purify it. For washing it, the polymer may be solid or may be liquid. For the latter, the liquid polymer may be washed in melt.

(6) Lithium Ion Recovery (Step (f))

In this step, an alkali metal hydroxide or an alkaline earth metal hydroxide is put into the reaction mixture which contains lithium chloride having been formed in the previous polycondensation step as the side product and dissolved in NMP and from which the product, polyarylene sulfide has been taken outside, thereby leading reaction between lithium ions and hydroxyl ions to give lithium hydroxide. The thus-formed lithium hydroxide is collected.

The alkali metal hydroxide and the alkaline earth metal hydroxide for use herein include, for example, sodium hydroxide, potassium hydroxide, magnesium hydroxide, etc. Of those, preferred is sodium hydroxide. The amount of the hydroxide compound to be put into the reaction mixture is controlled to fall between 0.9 and 1.1 mols, preferably between 0.95 and 1.05 mols, in terms of the hydroxyl group relative to one mol of the lithium ions existing in the mixture. If the amount is smaller than 0.9 mols, the lithium recovery will be insufficient; but if larger than 1.1 mols, the purity of the product, polyarylene sulfide will lower in relation to the subsequent operation. The reaction temperature in this step is not specifically defined. For example, when an aqueous solution of an alkali metal or alkaline earth metal hydroxide is put into the reaction mixture, the reaction temperature may fall between room temperature and 230° C., preferably between 65 and 150° C.; but when a solid of the hydroxide is put thereinto, the reaction temperature may fall between 60 and 230° C., preferably between 90 and 150° C. If the reaction temperature in this step is too low, the hydroxide compound added will be difficult to dissolve in the mixture and the reaction speed will be extremely slow. On the other hand, if the reaction temperature is too high, it will above the boiling point of NMP. In that case, the reaction must be effected under elevated pressure, but such is unfavorable to the process. The reaction time is not specifically defined.

(II) Second Aspect of Polymer Production Method

The second aspect of the polymer production method of the invention is to produce a polyarylene sulfide in one-stage or multi-stage polycondensation in which lithium sulfide and lithium hydroxide are added to a dihalogenoaromatic compound in the presence of an aprotic organic solvent. The method of polyarylene sulfide production is characterized in that the amount of lithium hydroxide to be added to the reaction system is controlled to fall between 21 and 100 mol % of lithium sulfide added thereto.

The second aspect differs from the first aspect in that the sulfur source to be added to the reaction system is lithium sulfide but not hydrogen sulfide. In the second aspect, therefore, the lithium cycle is outside the reaction system. The other materials to be used and the reaction conditions in the second aspect are the same as those in the first aspect.

Specifically, in the second aspect, lithium sulfide is added to a dihalogenoaromatic compound in a ratio (by mol) of dihalogenomatic compound/lithium sulfide falling between 0.9 and 1.2, in the presence of an aprotic organic solvent such as NMP or the like, while lithium hydroxide is added thereto in an amount of from 21 to 100 mol % of lithium sulfide added. In this, preferred is two-stage polymerization. In the former stage, a part of the starting materials are put into the reactor to lead prepolymerization, and in the latter stage, the remaining parts of the starting materials and water are added to the reaction system so as to satisfy the ratio, water/lithium sulfide falling between 0.1 and 2.5 by mol, thereby leading final polymerization to give the final polymer having an increased molecular weight. Regarding the reaction conditions, the polymerization temperature may fall between 190 and 240° C. in the former stage and between 240 and 270° C. in the latter stage, and the polymerization time may fall between 2 and 10 hours in the former stage and between 1 and 3 hours in the latter stage.

In the latter stage, lithium chloride is formed through polycondensation and dissolves in NMP. In this, when the lithium chloride concentration in the presence of water (water is dissolved in NMP) increases, the polymer reaction mixture will undergo phase separation to give two phases of lithium chloride-NMP phase and polymer-NMP phase. In that condition, the molecular weight of the polymer formed is much increased.

After the reaction, the polymer formed may be post-treated in any ordinary manner. For example, the reaction system containing the polymer formed is cooled, and the precipitate formed therein is taken out through centrifugation, filtration or the like, and the thus-separated polymer is washed a few times with an organic solvent or water under heat or at room temperature to purify it.

The invention is described in more detail with reference to the following Examples.

The test methods employed in Examples are mentioned below.

Measurement of Chloroform-soluble Component

Pellets as prepared through pelletization of a melt sample are cooled with liquid nitrogen, ground into powder, and sieved through a 9-mesh sieve, and the resulting powder sample is subjected to Soxhlet extraction with a solvent of chloroform for 8 hours. The resulting extract is filtered at a temperature not lower than 40° C. to remove the solvent therefrom, and the resulting solid residue is measured. This is the chloroform-soluble component of the sample. For the filtration, used is a cylindrical paper filter of ADVANTEC 84 (28×100 mm). 9 g of the powder sample is subjected to Soxhlet extraction. The chloroform-soluble component is represented by the ratio by weight (%) to the sample, polyarylene sulfide.

Spiral Flow Length

Used is Toshiba Kikai's JS30EPN (this is a 30-ton injection-molding machine) equipped with a spiral flow mold for 1 mm-thick sheets.

Concretely, a melt sample to be tested is injected into the mold under an injection pressure of 1000 kgf/cm$^2$ (set pressure 49%), at a sample temperature of 320° C. and at a mold temperature of 135° C., and is molded therein, for which the injection time is 10 seconds. The length (mm) of the sample flow having been injected in that condition is measured, and this indicates the spiral flow length of the sample tested.

Flexural Strength

Used is a Nippon Steel Works' J750EP (this is a 50-ton injection-molding machine). Concretely, a sample to be tested is press-molded at a sample temperature of 320° C. and at a mold temperature of 135° C. into test pieces having a size of 127×12.7×3.18 mm. The test pieces are measured according to ASTM-790. The unit is MPa.

Izod Impact Strength

The same test pieces as those for the flexural strength test are tested for the Izod impact strength with no notch, according to ASTM-D256. The unit is kJ/m$^2$.

Measurement of Inherent Viscosity 0.04 g±0.001 g of a polymer sample to be tested is dissolved in 10 cc of α-chloronaphthalene at 235° C. within a period of 15 minutes, and kept in a thermostat at 206° C. The viscosity of the polymer sample solution is measured and compared with the viscosity of α-chloronaphthalene with no polymer sample therein to obtain the relative viscosity of the polymer sample.

The inherent viscosity ηihr of the sample is represented by the following equation:

$$\eta ihr = ln(\text{relative viscosity})/\text{polymer concentration (dl/g)}$$

EXAMPLE 1

10 mols (459.4 g) of lithium sulfide, 9 mols (1323 g) of p-dichlorobenzene, 0.5 mols (20.98 g) of lithium hydroxide monohydrate, and 4.2 liters of NMP (N-methyl-2-pyrrolidone) were put into an autoclave having a capacity of 10 liters, reacted at 200° C. for 5 hours, and cooled to room temperature to obtain a prepolymer.

To the prepolymer, added were 1.0 mol (147.0 g) of p-dichlorobenzene, 1.9 mols (79.73 g) of lithium hydroxide monohydrate and 9.0 mols (162.1 g) of water, and reacted at 260° C. for 3 hours. After cooled to 100° C., the liquid phase was separated, and the polymer deposited was collected. The polymer was washed three times with cold water.

The polymer was again put into an autoclave having a capacity of 10 liters, to which were added 5 liters of NMP and 30 cc of acetic acid. The polymer was washed with these at 150° C. for 1 hour. After cooled, the solid polymer was washed with cold water until its electroconductivity reached 20 $\mu$S/cm or less. After thus washed, the polymer was dried in an air drier at 120° C. for 24 hours, and then further dried in vacuum at 120° C. for 24 hours.

60 parts by weight of the polymer, 40 parts by weight of glass fibers JAF591 (from Asahi Fiber Glass) and 1 part by weight of a silane coupling agent SH6040 (from Toray Dow Corning) were blended in dry, and pelletized through extraction at 320° C. into pellets.

The pure polymer powder was tested for the inherent viscosity, and the composite resin pellets were tested for the chloroform soluble content, the spiral flow length, the flexural strength and the Izod impact strength. Based on the test data, the polymer was evaluated for its properties. The data are in Table 1 below.

EXAMPLE 2

The same process as in Example 1 was repeated, except that the amount of lithium hydroxide monohydrate to be added to the prepolymer was varied from 1.9 mols (79.73 g) to 4.5 mols (118.8 g) and that of water to be added thereto was varied from 9.0 mols (162.1 g) to 5.0 mols (90.1 g). The test data are in Table 1.

EXAMPLE 3

10 mols (459.4 g) of lithium sulfide, 10 mols (1470 g) of p-dichlorobenzene, 3.5 mols (146.9 g) of lithium hydroxide monohydrate, 6.0 mols (108.1 g) of water and 4.2 liters of NMP (N-methyl-2-pyrrolidone) were put into an autoclave having a capacity of 10 liters, reacted at 260° C. for 3 hours. After cooled to 100° C., the liquid phase was separated, and the polymer deposited was collected. This was processed in the same manner as in Example 1. The test data are in Table 1.

EXAMPLE 4
Step of Hydrogen Sulfide Addition 415.94 g (4.2 mols) of NMP (N-methyl-2-pyrrolidone), 123.5 g of a mixture of LiOH and NaCl (1.5 mols each) and 27.0 g (1.5 mols) of deionized water were put into a 500 ml separable glass flask equipped with a paddle stirrer, and heated up to 130° C.

After this was heated so, hydrogen sulfide was introduced thereinto at a flow rate of 700 ml/min for 35 minutes. In this step, the liquid temperature was all the time controlled to be at 130° C. during the hydrogen sulfide addition.

Adding hydrogen sulfide was stopped, and the S (sulfur) content of the liquid was determined. The liquid absorbed 1.65 mols of S, and the ratio by mol of S/Li in the liquid was 1.1. The S (sulfur) content of the liquid was measured through iodometry. Briefly, diluted hydrochloric acid is added to a sample of the liquid, and an excess iodine solution is added thereto, and this is subjected to back titration with a standard solution of sodium thiosulfate.
Step of NaCl Separation The liquid having been absorbed hydrogen sulfide was transferred onto a glass filter kept at 130° C., and filtered therethrough under reduced pressure. The reside remaining on the filter was washed with a large amount of N-methyl-2-pyrrolidone at 130° C., and dried under reduced pressure at 150° C. The dried solid weighed 87.4 g. Its X-ray diffractiometry gave a spectrum of only NaCl and did not give a spectrum of LiOH.

From the result as above, it is understood that when hydrogen sulfide is introduced into a mixture of LiOH and NaCl, it reacts with only LiOH to give a complex soluble in N-methyl-2-pyrrolidone. In this step, therefore, the solid NaCl can be separated from the reaction mixture.
Step of Controlling Sulfur Content On the other hand, 400.0 g of the liquid having absorbed hydrogen sulfide was transferred into a separable flask of the same type as above, and heated up to 150° C., into which was introduced $N_2$ gas at a flow rate of 700 ml/min so as to expel the excess hydrogen sulfide from the liquid until the ratio by mol of S/Li in the liquid reached 0.50.

In that condition, $N_2$ gas was introduced into the liquid for 70 minutes to attain the molar ratio S/Li of 0.50.
Step of Polycondensation and Post-Treatment The liquid having been thus controlled in the previous step was transferred into a stainless steel autoclave having a capacity of 1 liter, and 173.0 g of paradichlorobenzene (PDCB) was added thereto to have a molar ratio, PDCB/S=1.00. Then, lithium hydroxide was added thereto to have a molar ratio LiOH/Li=0.30, relative to Li in the liquid. This was heated up to 240° C. and kept at the elevated temperature for 30 minutes to lead precondensation of the monomers. Next, this was further heated up to 260° C., at which the resulting prepolymer was further polymerized for 3 hours. After cooled, the granular polymer obtained was washed with pure water, substituted with acetone, and dried in a vacuum drier. The dry polymer weighed 119.5 g. It had an inherent viscosity $\eta$ihr of 0.34 dl/g. The inherent viscosity is an index of the molecular weight of the polymer.

60 parts by weight of the powdery polymer obtained herein, 40 parts by weight of glass fibers JAF591 (from Asahi Fiber Glass) and 1 part by weight of a silane coupling agent SH6040 (from Toray Dow Corning) were blended in dry, and pelletized through extraction at 320° C. into pellets.

The pure polymer powder was tested for the inherent viscosity, and the composite resin pellets were tested for the chloroform soluble content, the spiral flow length, the flexural strength and the Izod impact strength. Based on the test data, the polymer was evaluated for its properties. The data are in Table 1 below.
Step of Producing LiOH 415.94 g (4.2 mols) of N-methyl-2-pyrrolidone and 63.585 g (1.5 mols) of lithium chloride were put into a 500 ml separable glass flask equipped with a paddle stirrer, and lithium chloride was dissolved in the solvent at 90° C. To the resulting solution, added was 125.0 g of 48 wt. % sodium hydroxide solution (corresponding to 1.5 mols of NaOH). Immediately after the addition, a white solid was formed at a time. In a nitrogen atmosphere, this was heated to remove the dissolved water therefrom.

The dewatered mixture was cooled, and transferred onto a glass filter (G4) at room temperature, through which the mixture was filtered under reduced pressure. The residue remaining on the filter was dried at 150° C. under reduced pressure. The dried solid weighed 123.5 g. Its elementary analysis gave data of Na/Li/Cl (by mol)=1.03/1.00/1.00. Its X-ray diffractiometry gave spectral peaks for LiOH and NaCl. Through ion chromatography, neither lithium ions nor sodium ions were detected in the supernatant layer (NMP layer) from the solid. From the analytical data as above, it is understood that LiCl and NaOH were almost completely (100%) converted into LiOH and NaCl.

Comparative Example 1

The same process as in Example 1 was repeated, except that lithium hydroxide monohydrate was not added to the prepolymer and that the amount of water to be added to the prepolymer was varied from 9.0 mols (162.1 g) to 11 mols (198 g). The test data are in Table 1.

Comparative Example 2

The same process as in Example 1 was repeated, except that the amount of lithium hydroxide monohydrate added to the prepolymer was 1.5 mols (62.95 g) and that of water to be added thereto was varied from 9.0 mols (162.1 g) to 10 mols (180 g). The test data are in Table 1.

Comparative Example 3

The same process as in Example 3 was repeated, except that the amount of lithium hydroxide monohydrate was varied from 3.5 mols (146.9 g) to 10 mols (419.6 g). The test data are in Table 1.

REFERENCE EXAMPLE

A commercial product, Fortlon 1140A6 (from Polyplastics; this is reinforced with 40% by weight of glass fibers) was tested for its properties. The test data are in Table 1.

impact strength of the glass fiber-reinforced resin compositions of those Comparative Examples is not good. On the other hand, the inherent viscosity of the polymer of Example 4, for which is used hydrogen sulfide as the sulfur source, is high, and therefore the spiral flow length of the polymer composition is not long. However, the balance of flexural strength and Izod impact strength of the polymer composition of Example 4 is good. Compared with the resin composition of Reference Example, it is understood that the physical property balance of the resin compositions of the invention is much improved.

What is claimed is:

1. A polyarylene sulfide resin composition comprising (A) from 30 to 80% by weight of a polyarylene sulfide and (B) from 20 to 70% by weight of an inorganic filler, of which the chloroform soluble content is at most 0.5% by weight relative to the polyarylene sulfide in the composition.

2. Car parts as produced through injection molding of the polyarylene sulfide resin composition of claim 1.

3. The polyarylene sulfide of claim 1 having a chloroform soluble content of at most 0.5% by weight and having an inherent viscosity, ηinh, of from 0.05 to 0.4.

4. The polyarylene sulfide resin composition of claim 1, further comprising 0.1–3.0 parts by weight of a coupling agent.

5. The polyarylene sulfide resin composition of claim 1, wherein said inorganic filler is selected from the group consisting of glass fibers, carbon fibers, aramide fibers, potassium titanate whiskers, silicone carbonate whiskers, mica ceramic fibers, wollastonite, mica, talc, silica, alumina, kaolin, clay, silica-alumina, carbon black, calcium carbonate, titanium oxide, lithium carbonate, molybdenum disulfide, graphite, iron oxide, glass beads, calcite phosphate, calcium sulfate, magnesium carbonate, magnesium phosphate, silicon nitride, and hydrotalcite.

6. The polyarylene sulfide resin composition of claim 1, wherein said inorganic filler comprises glass fibers having a fiber length of between 0. 1–8 mm.

TABLE 1

|  | Inherent Viscosity (dl/g) | Amount of LiOH (mol %) | Chloroform Soluble Content (%) | SFL (mm) | Flexural Strength (MPa) | Izod Impact Strength (kJ/m$^2$) |
| --- | --- | --- | --- | --- | --- | --- |
| Example 1 | 0.21 | 24 | 0.42 | 167 | 314 | 76 |
| Example 2 | 0.21 | 50 | 0.22 | 165 | 300 | 77 |
| Example 3 | 0.21 | 35 | 0.23 | 168 | 301 | 78 |
| Example 4 | 0.34 | 30 | 0.22 | 15 | 310 | 78 |
| Comparative Example 1 | 0.21 | 5 | 0.60 | 165 | 289 | 59 |
| Comparative Example 2 | 0.21 | 20 | 0.54 | 168 | 288 | 57 |
| Comparative Example 3 | 0.21 | 10 | 0.57 | 167 | 287 | 58 |
| Reference Example | — | — | 0.87 | 156 | 276 | 65 |

As described above, the method of the invention produces polyarylene sulfides having a chloroform soluble content of not larger than 0.5% by weight, in any mode of single-stage polymerization (as in Example 3) and two-stage polymerization (as in Examples 1 and 2). Accordingly, glass fiber-reinforced resin compositions of the invention all have well-balanced properties of fluidity, flexural strength and Izod impact strength. As opposed to these, however, the chloroform soluble content of the polymers produced in Comparative Examples 1, 2 and 3, in which the blend ratio of lithium hydroxide monohydrate is small, is large. Therefore, the balance of fluidity, flexural strength and Izod 7. A polyarylene sulfide resin composition comprising:

(A) from 30 to 80% by weight of a polyarylene sulfide; and (B) from 20 to 70% by weight of an inorganic filler, wherein said polyarylene sulfide resin is prepared by reacting a dihalogenoaromatic compound with lithium sulfide in an aprotic organic solvent, in the presence of 21 to 100 mol % relative to lithium sulfide, of lithium hydroxide.

* * * * *